(12) United States Patent
Murata et al.

(10) Patent No.: US 8,814,548 B2
(45) Date of Patent: Aug. 26, 2014

(54) MOLD ASSEMBLY

(75) Inventors: Yoshiyuki Murata, Okazaki (JP); Tetsuo Hayashida, Toyota (JP)

(73) Assignee: Toyota Boshoku Kabushiki Kaisha, Aichi-Ken (JP)

( * ) Notice: Subject to any disclaimer, the term of this patent is extended or adjusted under 35 U.S.C. 154(b) by 633 days.

(21) Appl. No.: 12/975,801

(22) Filed: Dec. 22, 2010

(65) Prior Publication Data

US 2011/0159136 A1    Jun. 30, 2011

(30) Foreign Application Priority Data

Dec. 24, 2009  (JP) ................. 2009-292499

(51) Int. Cl.
| | |
|---|---|
| B29C 33/10 | (2006.01) |
| B29C 44/02 | (2006.01) |
| B29C 44/58 | (2006.01) |
| B29K 275/00 | (2006.01) |
| B29L 31/30 | (2006.01) |

(52) U.S. Cl.
CPC .......... B29C 44/588 (2013.01); *B29K 2275/00* (2013.01); *B29L 2031/3005* (2013.01); B29C 33/10 (2013.01); *Y10S 425/812* (2013.01); *Y10S 425/817* (2013.01)
USPC .......... 425/4 R; 425/127; 425/546; 425/812; 425/817 R

(58) Field of Classification Search
CPC .... B29C 33/10; B29C 44/588; B29C 44/3403
USPC ........... 425/4 R, 127, 546, 812, 817 R
See application file for complete search history.

(56) References Cited

U.S. PATENT DOCUMENTS 5,817,347 A * 10/1998 Tamcsin et al. ............... 425/546
7,500,839 B2 * 3/2009 Narumi ......................... 425/4 R

FOREIGN PATENT DOCUMENTS

| JP | 2003/181839 | 7/2003 |
|---|---|---|
| JP | 2005/081574 | 3/2005 |
| JP | 2005/081575 | 3/2005 |
| JP | 2005/153293 | 6/2005 |
| JP | 2009/083200 | 4/2009 |

OTHER PUBLICATIONS

U.S. Appl. No. 12/975,837 to Yoshiyuki Murata et al., which was filed on Dec. 22, 2010.

* cited by examiner

*Primary Examiner* — Joseph S Del Sole
*Assistant Examiner* — Thukhanh Nguyen
(74) *Attorney, Agent, or Firm* — Greenblum & Bernstein, P.L.C.

(57) ABSTRACT

A mold assembly that forms an expansion molded body by expanding foam raw material inside a cavity, includes a first die, a second die that closes together with the first die, wherein a sealed cavity is formed between the first die and the second die when the first die and the second die are closed, and a sealing member that is provided on at least one of the first die or the second die and seals the cavity, wherein at least one of a first space that is on a side of the sealing member that faces the cavity and leads to the cavity, or a second space that is formed inside the sealing member and leads to the cavity, is formed when the first die and the second die are closed.

6 Claims, 4 Drawing Sheets

MOLD ASSEMBLY

INCORPORATION BY REFERENCE

The disclosure of Japanese Patent Application No. 2009-292499 filed on Dec. 24, 2009 including the specification, drawings and abstract is incorporated herein by reference in its entirety.

BACKGROUND OF THE INVENTION

1. Field of the Invention

The invention relates to a mold assembly capable of molding an expansion molded body (such as a vehicle seat cushion).

2. Description of the Related Art

Japanese Patent Application Publication No. 2005-153293 (JP-A-2005-153293) describes one such known mold assembly. This mold assembly includes a first die and a second die that is able to close together with the first die such that a cavity is formed between the first die and the second die. This cavity is a molding space that follows the contour (i.e., the exterior shape) of the expansion molded body. When the second die is closed together with the first die, a sealed cavity is formed. Then foam raw material is expanded inside the cavity. Gas (i.e., high pressure air) remaining in the cavity at this time may adversely affect the expansion molded body.

The mold assembly described in JP-A-2005-153293 has a structure (i.e., a first concave portion and a second concave portion) for venting the gas inside the cavity (hereinafter also referred to as "degassing"). The first concave portion is a cutout portion (that is rectangular) provided on the die closing surface of the lower die. A plurality of these first concave portions is formed around the cavity. Also, the second concave portion is a cutout portion (that is groove-shaped) provided on the peripheral edge of the lower die, and is formed around the entire circumference of the cavity. With this related art, gas inside the cavity escapes to the first concave portion and the second concave portion, so problems (such as flash and underfill) with the expansion molded body due to poor degassing are able to be minimized. Incidentally, with this related art, the degassing structure (i.e., both concave portions) is formed directly on the lower die and the like, so the structure of the mold assembly itself tends to be complicated. Also, with the related art, the mold assembly itself must be replaced or repaired when the concave portions are damaged or during maintenance. Therefore, when considering the manufacturing cost and the like of the mold assembly, the structure of the related art is not a structure that can simply be employed without much thought.

SUMMARY OF THE INVENTION

The invention thus provides a relatively simple structure for venting gas inside a cavity.

The mold assembly of the invention is configured to form an expansion molded body by expanding foam raw material inside a cavity, and includes a first die and a second die that closes together with the first die. When the first die and the second die are closed, a sealed cavity is formed between the first die and the second die. A structure for venting gas in the cavity should be provided in this kind of mold assembly, and it is preferable that this structure be as simple as possible.

Here, as one aspect of the invention, a sealing member (i.e., a member that is separate from the dies) that can seal the cavity is provided on at least one of the first die or the second die. Therefore, in an aspect of the invention, at least one of a first space that is on a side of the sealing member that faces the cavity, and that leads to the cavity, or a second space that is formed in the sealing member and leads to the cavity, is formed when the first die and the second die are closed. According to this aspect of the invention, gas inside the cavity is able to escape by the space or spaces formed in the sealing member (that is a relatively simple structure). Also, in an aspect of the invention, the structures of the first space and the second space are able to be changed by changing the design of the sealing structure (i.e., without having to modify the first die or the second die).

The sealing member described above may have a first elastic body that is arranged around the cavity, and a second elastic body that is adjacent to the first elastic body and faces the cavity. The second elastic body may be harder than the first elastic body. Also, when the first die and the second die are closed, the first elastic body may abut against both the first die and the second die (i.e., such that the cavity is sealed), and the first space may be formed above the second elastic body. The first space formed by the sealing member (that is a relatively simple structure) enables gas inside the cavity to escape efficiently. Using the hard second elastic body (i.e., the second elastic body with excellent workability) at this time enables the first space to be formed easily.

The sealing member described above may have a first elastic body arranged around the cavity, and a third elastic body that is arranged around the first elastic body. When the first die and the second die are closed, the first elastic body and the third elastic body may each abut against both the first die and the second die (such that the cavity is sealed), and the second space may be formed between the first elastic body and the third elastic body. The second space formed by the sealing member (that is a relatively simple structure) enables gas inside the cavity to escape efficiently.

BRIEF DESCRIPTION OF THE DRAWINGS

The features, advantages, and technical and industrial significance of this invention will be described in the following detailed description of example embodiments of the invention with reference to the accompanying drawings, in which like numerals denote like elements, and wherein.

DETAILED DESCRIPTION OF EMBODIMENTS

Figure 1:
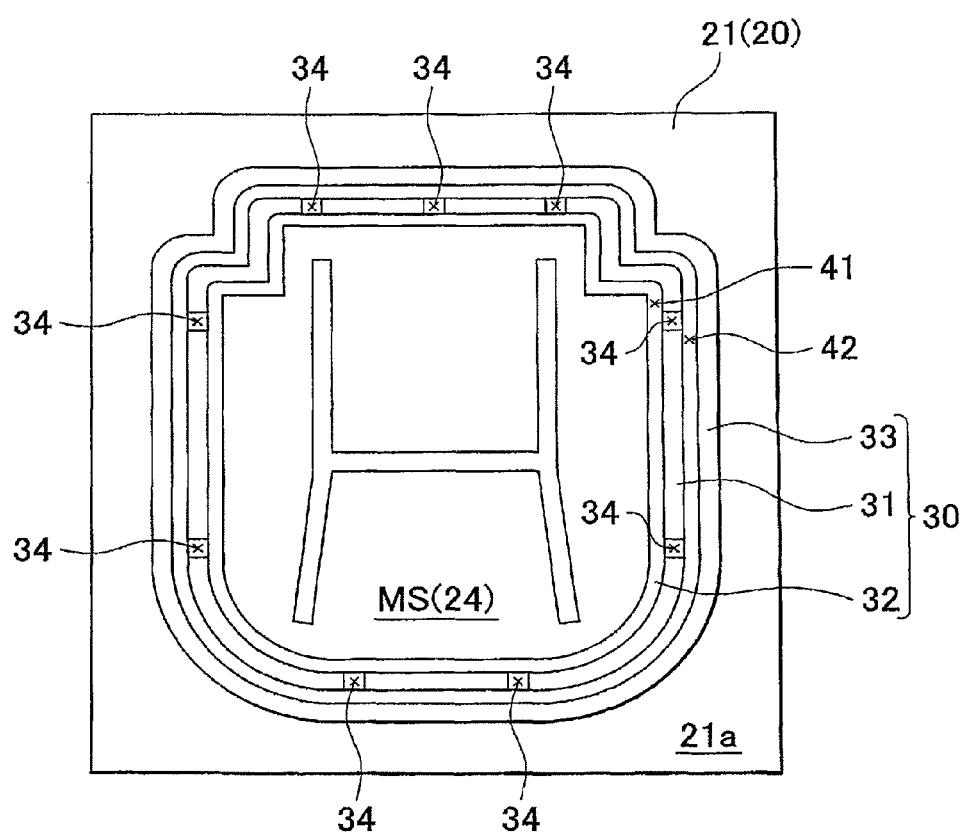
FIG. 1 is a front view of a first die.

Hereinafter, example embodiments of the invention will be described with reference to FIGS. 1 to 3C. Incidentally, in the drawings, reference character UP denotes the upward direction of a mold assembly, and reference character DW denotes the downward direction of the mold assembly. In this example embodiment, a vehicle seat cushion 2P (one example of an expansion molded body) is molded by a mold assembly 20 that will be described later (see FIGS. 3A to 3C). The cushion 2P is a member (made of polyurethane foam) on which an occupant can sit and has a center portion 2C and a curved portion 2E. The center portion 2C is a flat portion (in a longitudinal sectional view). Also, the curved portion 2E is a generally inverse L-shaped portion (in a longitudinal sectional view), and is formed at an end portion of the center portion 2C.

[Mold Assembly]

The mold assembly 20 of this example embodiment includes a basic structure (i.e., a first die 21, a second die 22, and a cavity 24), and a sealing member 30 that will be described later (see FIGS. 1 to 3C). The first die 21 (that is generally rectangular) has a surface that defines a molding space MS, and a first die closing surface 21a. The molding space MS is a concave portion formed in the center of the first die 21, and has a shape (i.e., forms the cavity 24) that follows the shape of the cushion 2P when the second die 22 is closed together with the first die 21. The first die closing surface 21a is a sloped portion around the cavity 24, that slopes down toward the cavity 24 (see FIG. 2). Also, the second die 22 has an intermediate die 22m and an upper die 22u arranged around the intermediate die 22m. The upper die 22u has a second die closing surface 22a. The upper die 22u and the intermediate die 22m are each able to be individually brought closer to/farther away from the first die 21 (i.e., be made to open/close) by a raising/lowering mechanism or a hinge member, not shown. The second die closing surface 22a is a sloped surface of the upper die 22u and slopes down toward the cavity 24. The second die closing surface 22a faces the first die closing surface 21a.

Figure 3A:
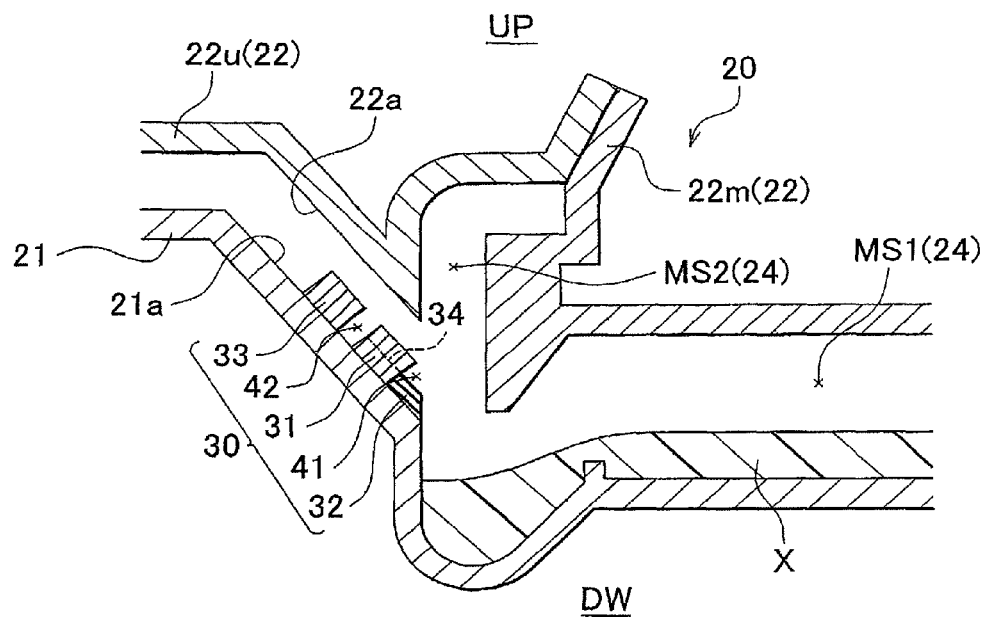
FIGS. 3A, 3B, and 3C are longitudinal sectional views of a portion of the mold assembly, with FIG. 3A being a view when polyurethane raw material is poured in, FIG. 3B being a view during expansion of the polyurethane raw material, and FIG. 3C being a view when expansion of the polyurethane raw material is complete.
Figure 3B:
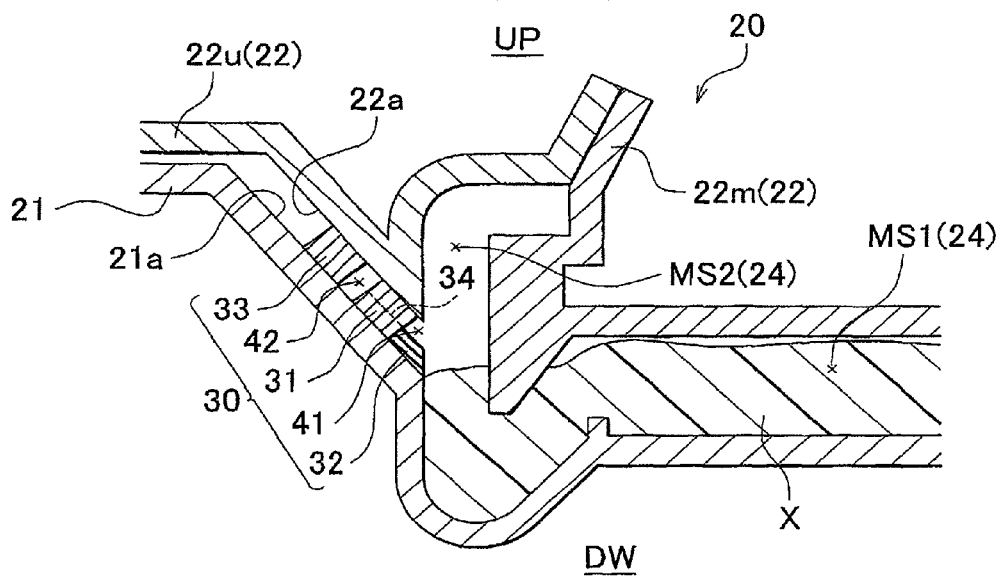
Figure 3C:
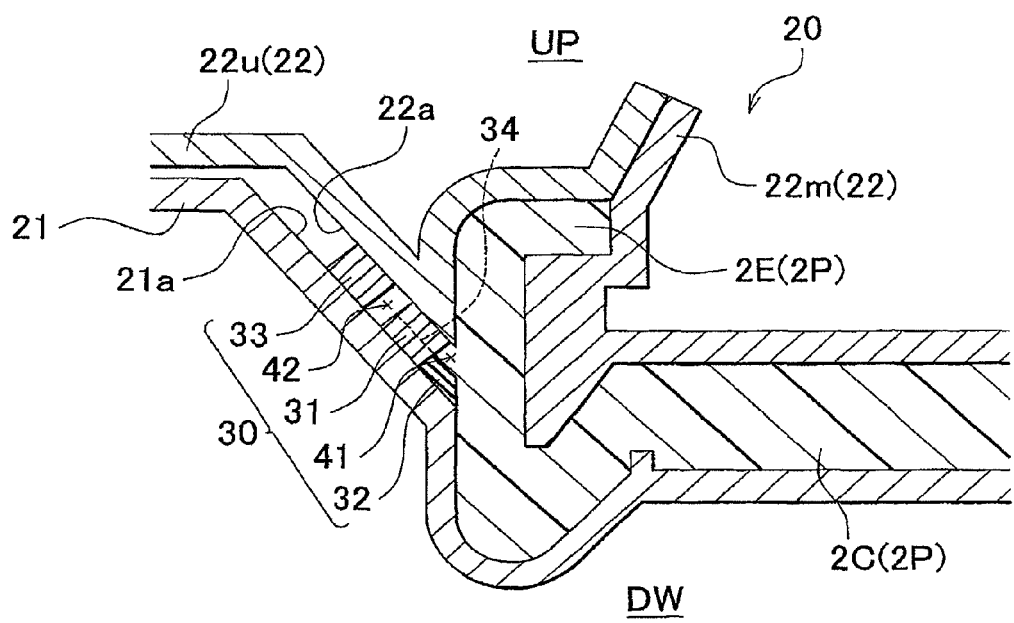

In this example embodiment, the upper die 22u is arranged around the intermediate die 22m and the mold assembly 20 is closed by the first die 21 and the second die 22 (see FIGS. 3A to 3C). A molding space MS1 (part of the cavity 24) is formed that corresponds to the center portion 2C between the first die 21 and the second die 22. Also, a molding space MS2 (another part of the cavity 24) that corresponds to the curved portion 2E is formed between the intermediate die 22m and the upper die 22u. The first die closing surface 21a and the second die closing surface 22a are arranged facing each other when the first die 21 and the second die 22 are closed together. With this kind of structure, it is preferable to minimize problems (such as flash and underfill) with the cushion 2P due to poor degassing by providing a structure that vents gas inside the cavity 24 on either the first die closing surface 21a or the second die closing surface 22a. Therefore, in this example embodiment, gas inside the cavity 24 is effectively vented by the sealing member 30 (that has a simple structure) that will be described later.

[Sealing Member]

The sealing member 30 is formed by a plurality of elastic bodies (i.e., a first elastic body 31, a second elastic body 32, and a third elastic body 33). A plurality of spaces (i.e., a first space 41 and a second space 42) is formed around the sealing member 30 (see FIGS. 1 to 3C). Also in this example embodiment, the sealing member 30 is arranged on the first die closing surface 21a, and gas inside the cavity 24 is able to be efficiently vented by this sealing member 30. Each of these structures will now be described in detail.

(First Elastic Body)

Figure 2:
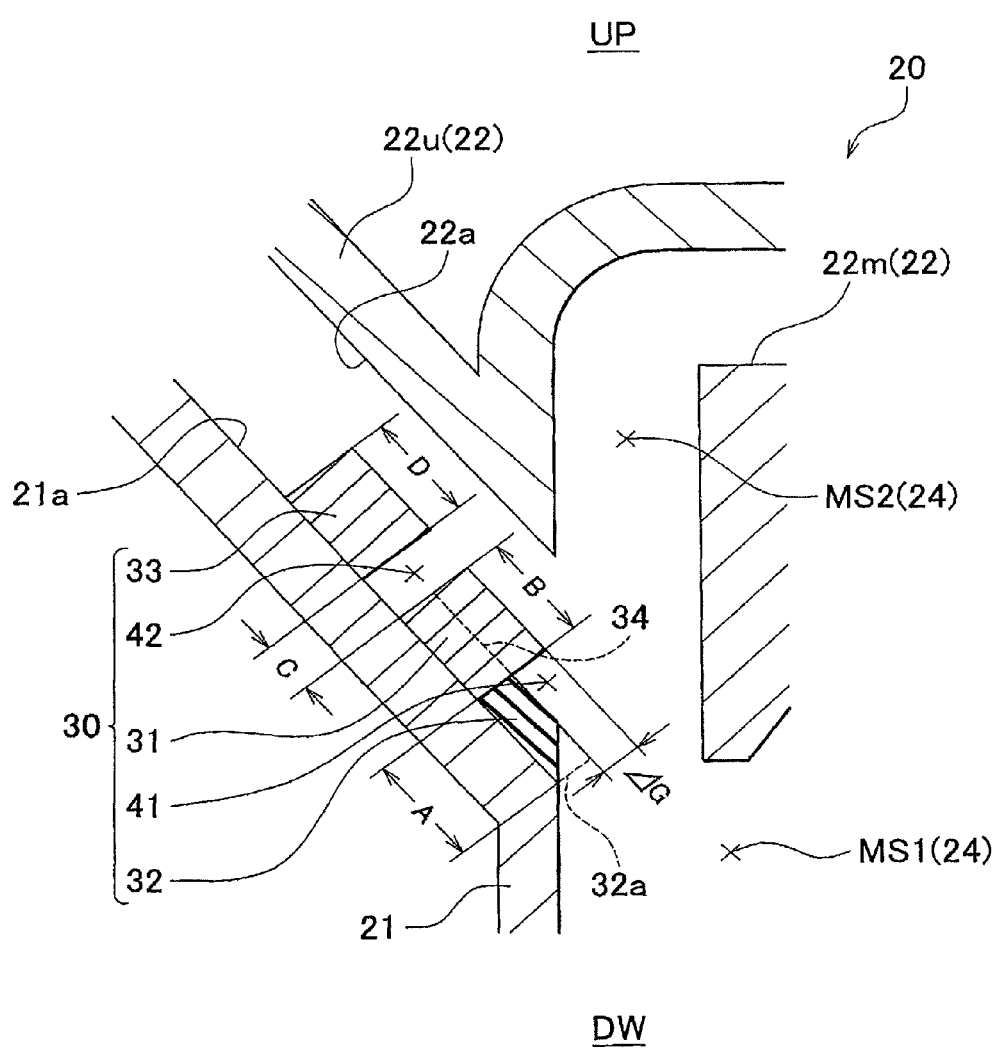
FIG. 2 is a longitudinal sectional view of a portion of a mold assembly.

The first elastic body 31 is a member (that is ring-shaped when viewed from above) having rubber elasticity, and is arranged around the cavity 24 (see FIGS. 1 and 2). The first elastic body 31 (i.e., the material thereof) is not particularly limited. For example, the first elastic body 31 may be made of soft rubber (having a HS hardness HA of 60° to 70° that will be described later) or resin. Also, the first elastic body 31 (that is generally rectangular in a longitudinal sectional view) abuts against both the first die 21 and the second die 22 when the first die 21 and the second die 22 are closed. As a result, the sealed cavity 24 is formed between the first die 21 and the second die 22. Here, the width dimension B of the first elastic body 31 is not particularly limited, but a good seal of the cavity 24 can be ensured by setting the width dimension B between 3 mm and 20 mm, inclusive, for example. Also, the height (i.e., thickness) dimension of the first elastic body 31 is not particularly limited, but is preferably set higher than the second elastic body 32 that will be described later.

Here, examples of material having rubber elasticity include natural rubber, synthetic rubber (including a thermoset elastomer), a thermoplastic elastomer, resin (soft resin and hard resin), as well as a composite of these. Examples of synthetic rubber include acrylic rubber, nitrile rubber, isoprene rubber, ethylene propylene rubber, epichlorohydrin rubber, chloroprene rubber, butadiene rubber, styrene-butadiene rubber, polyisobutylene (butyl rubber), and a thermoset elastomer (urethane rubber, silicon rubber, and fluoro-rubber). The hardness of these materials can be measured based on JISK 6253. Material with a hardness (JIS hardness HA) of 60° to 70° according to a durometer hardness test (type A) of JISK 6253, for example, may be referred to as soft rubber.

(Second Elastic Body)

The second elastic body 32 is, for example, a member (that is ring-shaped when viewed from above) having rubber elasticity, and may be arranged to the inside of the first elastic body 31 (i.e., on the side facing the cavity 24) (see FIGS. 1 and 2). The second elastic body 32 (i.e., the material thereof) is not particularly limited, but it is preferably harder than the first elastic body 31. For example, the second elastic body 32 may be made of hard rubber (having a JIS hardness HA of 70° to 95°) or resin. Also, using hard rubber for the second elastic body 32 makes it possible to better prevent polyurethane foam from excessively adhering to the second elastic body 32.

Here, the width dimension A of the second elastic body 32 is not particularly limited, but a good volume of the first space 41 is able to be ensured by setting the width dimension A between 5 mm and 10 mm, inclusive. If the width dimension A is less than 5 mm, productivity of the cushion 2P may decrease. Also, if the width dimension A is greater than 10 mm, the appearance of the cushion 2P (i.e., the seat) may suffer. Also, the height (i.e., the thickness) dimension of the second elastic body 32 is not particularly limited, but is preferably lower than that of the first elastic body 31. Making the height dimension of the second elastic body 32 low enables a step (i.e., the first space 41) to be formed between the second elastic body 32 and the first elastic body 31. Also in this example embodiment, the second elastic body 32 (that is generally rectangular in a longitudinal sectional view) is arranged on an edge portion of the first die closing surface 21a. Then a portion (i.e., a corner 32a) of the second elastic body 32 that protrudes into the cavity 24 is cut away or the like, such that one side surface of the second elastic body 32 is formed flush with the inside surface of the cavity 24. This forming process enables an opening to the first space 41 to be formed. Using a hard second elastic body 32 (i.e., the second elastic body 32 with excellent formability) facilitates the forming described above (i.e., the forming of the first space 41).

(Third Elastic Body)

The third elastic body 33 is a member (that is ring-shaped when viewed from above) having rubber elasticity, and is arranged to the outside of the first elastic body 31 (see FIGS. 1 and 2). The third elastic body 33 (i.e., the material thereof) is not particularly limited. For example, the third elastic body 33 may be made of soft rubber (having a JIS hardness HA of 60° to 70°) or resin. Also, the third elastic body 33 (that is generally rectangular in a longitudinal sectional view) abuts against both the first die 21 and the second die 22 when the first die 21 and the second die 22 are closed. As a result, the sealed cavity 24 is formed between the first die 21 and the second die 22.

Here, the width dimension D of the third elastic body 33 is not particularly limited, but a good seal of the cavity 24 can be ensured by setting the width dimension D between 3 mm and 20 mm, inclusive, for example. Also, the height (i.e., the thickness) dimension of the third elastic body 33 is not particularly limited, but is preferably the same as that of the first elastic body 31. Also, the radial dimension of the third elastic body 33 is not particularly limited, but is preferably larger than that of the first elastic body 31. Making the radial dimension of the third elastic body 33 large enables a gap (i.e., the second space 42 that will be described later) to be formed between the third elastic body 33 and the first elastic body 31.

(First Space)

The first space 41 is a space that leads to the cavity 24 and is formed on one side (i.e., the side facing the cavity 24) of the sealing member 30 (see FIGS. 2 and 3A to 3C). In this example embodiment, the height dimension of the second elastic body 32 is set smaller than that of the first elastic body 31. Also, the first elastic body 31 and the second elastic body 32 are arranged adjacent to one another (in a stepped manner) on the first die closing surface 21a. A gap (i.e., the first space 41) is formed between the second elastic body 32 and the second die closing surface 22a by closing the first die 21 and the second die 22 together in this state. The first space 41 in this example embodiment is formed around the entire periphery of the cavity 24. One side of the first space 41 is opens to (i.e., leads to) the cavity 24, and the other side of the first space 41 is closed off by the first elastic body 31.

Here, the volume of the first space 41 may be set appropriately according to the volume of the cavity 24 and the structure of the expansion molded body. For example, if the total volume of the cavity 24 is 100, the volume of the first space 41 may be set between 0.01 and 10, inclusive, according to the amount of foam raw material that is to be poured in. Also, in this example embodiment, the volume of the first space 41 may be changed relatively easily by appropriately setting the height dimensions of the first elastic body 31 and the second elastic body 32, for example. For example, when a typical cushion 2P (for one occupant) is expansion molded, the height dimension AG of the first space 41 may be set between 0.1 mm and 1.0 mm, inclusive, by adjusting the height dimensions of the first elastic body 31 and the second elastic body 32 or the like. Also, the width dimension of the first space 41 may be set between 3 mm and 30 mm, inclusive, by adjusting the width dimension A of the second elastic body 32 or the like.

(Second Space)

The second space 42 is a space that leads to the cavity 24, and is formed in the sealing member 30 (i.e., between the first elastic body 31 and the third elastic body 33) (see FIGS. 2 and 3A to 3C). In this example embodiment, when the first elastic body 31 and the third elastic body 33 are arranged on the first die closing surface 21a, they are arranged with a gap between them. A gap (i.e., the second space 42) is formed between the first elastic body 31 and the third elastic body 33 by closing the first die 21 and the second die 22 together in this state. Also, a communicating hole 34 that communicates the second space 42 with the cavity 24 is formed in the first elastic body 31. As a result, the second space 42 is formed in the sealing member 30, and is communicated with (i.e., leads to) the cavity 24 via the communicating hole 34. The second space 42 in this example embodiment is formed around the entire periphery of the cavity 24 and leads to the cavity 24 via a plurality of the communicating holes 34 (see FIG. 1).

Here, the volume of the second space 42 can be set appropriately according to the volume of the cavity 24 and the structure of the expansion molded body. For example, if the total volume of the cavity 24 is 100, the volume of the second space 42 may be set between 0.01 and 10, inclusive, according to the amount of foam raw material that is to be poured in. Also, in this example embodiment, the volume of the second space 42 may be changed relatively easily by appropriately setting the dimension of the gap between the first elastic body 31 and the second elastic body 32 or the like. For example, when a typical cushion 2P (for one occupant) is expansion molded, the width dimension C of the second space 42 may be set between 3 mm and 15 mm, inclusive, by adjusting the dimension of the gap between the first elastic body 31 and the third elastic body 33 or the like.

[Molding Operation]

Next, a molding operation in which polyurethane raw material X (in liquid form) is poured into the cavity 24 will be described with reference to FIGS. 3A to 3C. At the same time as, or around the same time as, the molding operation, the first die 21 and the second die 22 are closed, such that the first elastic body 31 and the third elastic body 33 abut against both the first die 21 and the second die 22, and the cavity 24 becomes sealed. Also, the first space 41 is formed by the second elastic body 32 and the second space 42 is formed between the first elastic body 31 and the third elastic body 33.

Next, the polyurethane raw material X in the cavity 24 is expanded. As a result, gas inside the cavity 24 flows into the first space 41 or the second space 42. Having the gas inside the cavity 24 escape in this way makes it possible to minimize problems (such as flash and underfill) with the cushion 2P due to poor degassing. Incidentally, in this example embodiment, the polyurethane raw material X may harden (producing flash) in the first space 41. Flash corresponding to the first space 41 is thin and soft, and there is only a very small amount of it, so removal of this flash is either unnecessary or can be done by hand.

As described above, with this example embodiment, gas inside the cavity 24 is able to be efficiently vented by the spaces 41 and 42 formed by the sealing member 30 (that has a simple structure). Therefore, in this example embodiment, post processing (processing for flash and underfill) after removal from the mold are able to be as simple as possible, so productivity of the cushion 2P can be improved and manufacturing cost can be reduced. Also, in this example embodiment, the areas of the first space 41 and the second space 42 can be appropriately changed (without having to change the design of the first die 21 or the second die 22) by changing the structure of the sealing member 30. For example, the shape or the volume or the like of the first space 41 can be changed by changing the structure of the second elastic body 32. Also, the shape or the volume or the like of the second space 42 can be changed by changing the structures of first elastic body 31 and the second elastic body 32. Also, according to this example embodiment, using hard rubber for the second elastic body 32 makes it easier to form the first space 41, as well as prevents or reduces polyurethane foam from excessively adhering (sticking).

Test Example

Hereinafter, the example embodiment will be described based on a test example, but the invention is not limited to this test example. In this test example, a vehicle seat cushion (for one occupant) made of polyurethane foam was formed using the mold assembly shown in FIGS. 1 and 2. Polyol ("TLB-213" made by Asahi Glass Co., Ltd.) and isocyanate ("Coronate C1021" made by Nippon Polyurethane Industry Co., Ltd.) were used as the polyurethane raw material. The volume of the cavity was set to 0.018 m³. Also, the amount of urethane raw material poured into the cavity was set at 1.26 kg. Also, the mold temperature (and time) during expansion molding was set to 65±3° C. (for five minutes), and the mold temperature (and time) during hardening was set to 65±3° C. (for five minutes).

Example 1

In Example 1, only the second space was formed, and the width dimension of this second space was set at 15 mm. Also, the width dimensions of the first elastic body and the third elastic body were set at 15 mm, and the width dimension of the second elastic body was set at 5 mm. Also, urethane resin (soft resin) was used for the first elastic body and the third elastic body, and epoxy resin (hard resin) was used for the second elastic body.

Example 2

In Example 2, the first space and the second space were formed. The height dimension of the first space was set at 0.4 mm, and the width dimension of the second space was set at 15 mm. The other conditions (i.e., the width dimensions and the materials) were the same as they were in Example 1.

Example 3

In Example 3, the first space and the second space were formed. The height dimension of the first space was set at 0.8 mm, and the width dimension of the second space was set at 15 mm. The other conditions (i.e., the width dimensions and the materials) were the same as they were in Example 1.

Example 4

In Example 4, the first space and the second space were formed. The height dimension of the first space was set at 0.4 mm, and the width dimension of the second space was set at 15 mm. Also, the hard resin described above was used for the first elastic body and the third elastic body, and the soft resin described above was used for the second elastic body. The other conditions (i.e., the width dimensions and the materials) were the same as they were in Example 1.

Example 5

In Example 5, the first space and the second space were formed. The height dimension of the first space was set at 0.4 mm, and the width dimension of the second space was set at 5 mm. Also, the width dimension of the second elastic body was set at 8 mm. The other conditions (i.e., the width dimensions and the materials) were the same as they were in Example 1.

Example 6

In Example 6, only the first space was formed (the third elastic body was omitted). Also, the height dimension of the first space was set at 0.4 mm. The width dimension of the first elastic body was set at 20 mm, and the width dimension of the second elastic body was set at 5 mm. The other conditions (i.e., the width dimensions and the materials) were the same as they were in Example 1.

Comparative Example 1

In Comparative example 1, only the second elastic body was used (i.e., the first space and the second space were omitted). Also, the width dimension of the second elastic body was set at 25 mm, and the hard resin described above was used as the material of the second elastic body.

(Measurement Criteria)

One hundred (100) expansion molded bodies were formed in the mold assembly of each example and in the mold assembly of the comparative example. Then the maximum length and the maximum thickness of flash produced on the one-hundredth expansion molded body from each mold assembly were measured. Furthermore, the external appearances of the expansion molded bodies (i.e., whether there is underfill) were checked and the labor involved in the post processing of flash was determined based on the following criteria. "A" indicates that no processing was necessary, "B" indicates that removal could be done by hand, an "C" indicates that removal was possible using a tool such as scissors, and a "U" indicates that there was underfill (i.e., that there was a portion that was not filled).

The results of the expansion test are shown in Table 1 below.

TABLE 1

| | Comparative example 1 | Example 1 | Example 2 | Example 3 | Example 4 | Example 5 | Example 6 |
|---|---|---|---|---|---|---|---|
| (a) | Hard resin | Hard resin | Hard resin | Hard resin | Soft resin | Hard resin | Hard resin |
| (b) | — | Soft resin | Soft resin | Soft resin | Hard resin | Soft resin | Soft resin |
| (c) | — | Soft resin | Soft resin | Soft resin | Hard resin | Soft resin | Soft resin |
| ΔG | — | 0 mm | 0.4 mm | 0.8 mm | 0.4 mm | 0.4 mm | 0.4 mm |
| (A) | 25 mm | 5 mm | 5 mm | 5 mm | 5 mm | 8 mm | 5 mm |
| (B) | — | 15 mm | 15 mm | 15 mm | 15 mm | 15 mm | 20 mm |
| (C) | — | 15 mm | 15 mm | 15 mm | 15 mm | 5 mm | — |
| (D) | — | 15 mm | 15 mm | 15 mm | 15 mm | 15 mm | — |
| Flash condition | Length: 15 to 30 mm Thickness: 0.8 to 1.2 mm | Length: 2 to 3 mm Thickness: underfill tendency | Length: 4 to 5 mm Thickness: 0.4 mm or less | Length: 4 to 5 mm Thickness: 0.6 to 0.8 mm | Length: 5 to 8 mm Thickness: 0.8 to 1.0 mm | Length: 6 to 8 mm Thickness: 0.4 to 0.6 mm | Length: 10 to 15 mm Thickness: 0.5 to 0.7 mm |
| Determination | C | B/U | A | A | B | A | B |

[Results and Observations]

Referring to Table 1, with the mold assembly of Comparative example 1, a large amount of flash was produced on the expansion molded body and needed to be removed using a tool such as scissors. In contrast, with the mold assemblies of Examples 1 to 6, only a small amount a flash was produced on the expansion molded bodies, and removal was either unnecessary or could be done by hand. That is, in Example 2 and Example 3, almost no flash was produced on the expansion molded bodies. As a result, the quality of the expansion molded bodies was at a level such that the expansion molded bodies could be shipped without having to undergo post processing after being removed from the molds. Also, with Example 1, although there was a slight underfill tendency, the very small amount of flash on the expansion molded body could be removed by hand. Also, in Examples 4 to 6, there was no underfill, and the very small amount of flash on the expansion molded bodies was able to be removed by hand. From these results, it is evident that, with the mold assemblies of Examples 1 to 6, gas inside the cavity is able to escape via the spaces formed by the sealing member (that has a relatively simple structure). Therefore, with the mold assemblies of Examples 1 to 6, post processing after removal from the mold is able to be simplified, which improves productivity of the expansion molded bodies and reduces costs.

The mold assembly of this example embodiment is not limited to the example embodiment described above. That is, various other example embodiments are also possible. Several will now be described. (1) In this example embodiment, an example is described in which both the first space 41 and the second space 42 are formed by the sealing member 30. However, it is not absolutely necessary that both the first space and the second space be formed by the sealing member. That is, it is sufficient to just have one of the first space or the second space be formed by the sealing member. Also, in this example embodiment, an example is described in which the sealing member 30 is arranged on the first die closing surface 21a. Alternatively, however, the sealing member 30 may be arranged on the second die closing surface 22a, or on both the first die closing surface 21a and the second die closing surface 22a.

(2) Also, in this example embodiment, the elastic bodies 31, 32, and 33 are all formed by separate members. These elastic bodies may also be integrated (i.e., an integrally molded article). Integrally molding at least two of these three elastic bodies 31, 32, and 33 makes it easier to arrange the sealing member (i.e., makes it easier to manage). For example, the first elastic body and the second elastic body may be molded by two-color molding. Also, a connecting portion that connects the first elastic body with the second elastic body may be formed on the sealing member. Further, all of the elastic bodies may also be integrally formed.

(3) Also, in this example embodiment, the first space 41 is formed at the stepped portion between the first elastic body 31 and the second elastic body 32. The shape (i.e., the longitudinal section) of the first space may be any one of a variety of shapes such as stepped, sloped, or arced. Also, in this example embodiment, the first space 41 is formed in a single continuous line. Alternatively, the first space may be intermittently formed around the cavity 24. For example, one or a plurality of first spaces that are holes (i.e., point-like) may be formed in an upper portion of the second elastic body.

(4) Also, in this example embodiment, the second space 42 is formed in a single continuous line. Alternatively, the second space may be intermittently formed around the cavity 24. For example, the second space may be divided into a plurality of sections that are divided by a partition wall. The partition wall also functions as a reinforcing member, in addition to being a connecting portion that connects the first elastic body with the third elastic body.

(5) Also, the structure of the mold assembly 20 of this example embodiment is only an example. For example, this example embodiment described an example in which the mold assembly 20 has the first die 21, the intermediate die 22m, and the upper die 22u (i.e., in which the mold assembly 20 is a so-called three-part mold assembly). Alternatively, a mold assembly that has a first die and a second die (that is flat) (i.e., a so-called two-part mold assembly) may be used. Also, the structure of the first die and the cavity may be changed appropriately according to the shape and the like of the cushion. (6) Also, a discharge hole that leads out of the mold assembly 20 may also be provided in the mold assembly 20 of this example embodiment. At this time, one end of the discharge hole may open to the outside and the other end of the discharge hole may open into the second space. That is, the mold assembly of this example embodiment may be such that the cavity is completely sealed, or such that the cavity is partially sealed (with the option of being sealed). Incidentally, if the cavity is partially sealed, it must be sealed enough so that expansion molding will not be adversely affected.

(7) Also, in this example embodiment, the cushion 2P is given as an example of an expansion molded body. According to the structure of this example embodiment, a cushion (i.e., an expansion molded body) of any of a variety of vehicle interior parts may be molded. Polyurethane foam is given as an example of the material of the expansion molded body, but the material of the expansion molded body is in no way limited to this. Also, examples of material that may be used for a typical expansion molded body (i.e., the foam raw material component) include polyurethane (polyol and isocyanate), polystyrene, vinyl chloride resin, polyethylene, polyvinyl alcohol, phenolic resin, urea resin, epoxy resin, silicon resin, and a composite of these. Incidentally, a foaming agent may be mixed in with the foam raw material when necessary.

While the invention has been described with reference to example embodiments thereof, it should be understood that the invention is not limited to the example embodiments or constructions. To the contrary, the invention is intended to cover various modifications and equivalent arrangements. In addition, while the various elements of the example embodiments are shown in various combinations and configurations, which are exemplary, other combinations and configurations, including more, less or only a single element, are also within the scope of the invention.

What is claimed is:

1. A mold assembly that forms an expansion molded body by expanding foam raw material inside a cavity, comprising:
   a first die;
   a second die that is closable together with the first die, wherein a sealed cavity is defined between the first die and the second die when the first die and the second die are closed; and
   a sealing member that is provided on at least one of the first die and the second die and seals the cavity, wherein at least one of a first space that is on a side of the sealing member that is open to the cavity, and a second space that is provided in the sealing member and leads to the cavity, is defined when the first die and the second die are closed, wherein
   the sealing member has a first elastic body that is arranged around the cavity and is provided between the first space and the second space, and a second elastic body that is provided adjacent to the first elastic body at an inner side of the mold assembly toward the cavity, and when the first die and the second die are closed, the first elastic body abuts against both the first die and the second die.

2. The mold assembly according to claim 1, wherein the second elastic body is harder than the first elastic body.

3. The mold assembly according to claim 1, wherein the sealing member has the first elastic body arranged around the cavity, and a third elastic body that is arranged around the first elastic body, and when the first die and the second die are closed, the first elastic body and the third elastic body each abut against both the first die and the second die, and the second space is defined between the first elastic body and the third elastic body.

4. The mold assembly according to claim 3, further comprising:

a connecting portion that connects the first elastic body with the third elastic body.

5. The mold assembly according to claim 2, wherein the sealing member has the first elastic body, and a third elastic body that is arranged around the first elastic body, and when the first die and the second die are closed, the first elastic body and the third elastic body each abut against both the first die and the second die, and the second space is defined between the first elastic body and the third elastic body.

6. The mold assembly according to claim 5, further comprising:

a connecting portion that connects the first elastic body with the third elastic body.

\* \* \* \* \*